US011921770B2

United States Patent
Shang (10) Patent No.: US 11,921,770 B2
(45) Date of Patent: Mar. 5, 2024

(54) ELECTRONIC ELEMENT SUPPORTING DATA INQUIRY METHOD, STORAGE MEDIUM AND TERMINAL

(71) Applicant: SHENZHEN SEKORM COMPONENT NETWORK CO., LTD, Guangdong (CN)

(72) Inventor: Lianglei Shang, Guangdong (CN)

(73) Assignee: SHENZHEN SEKORM COMPONENT NETWORK CO., LTD, Shenzhen (CN)

( * ) Notice: Subject to any disclaimer, the term of this patent is extended or adjusted under 35 U.S.C. 154(b) by 276 days.

(21) Appl. No.: 17/413,132

(22) PCT Filed: Dec. 28, 2018

(86) PCT No.: PCT/CN2018/124780
§ 371 (c)(1),
(2) Date: Jun. 11, 2021

(87) PCT Pub. No.: WO2020/133185
PCT Pub. Date: Jul. 2, 2020

(65) Prior Publication Data
US 2022/0067079 A1 Mar. 3, 2022

(51) Int. Cl.
*G06F 16/31* (2019.01)
*G06F 16/33* (2019.01)
*G06F 16/38* (2019.01)

(52) U.S. Cl.
CPC .............. *G06F 16/38* (2019.01); *G06F 16/31* (2019.01); *G06F 16/3331* (2019.01)

(58) Field of Classification Search
CPC ...... G06F 16/38; G06F 16/31; G06F 16/3331; G06F 16/383; G06F 16/387; G06F 16/94;
(Continued)

(56) References Cited

U.S. PATENT DOCUMENTS 5,748,953 A * 5/1998 Mizutani ................. G06F 16/31
2004/0205667 A1* 10/2004 Hsu ........................ G06F 40/166
715/256

(Continued)

FOREIGN PATENT DOCUMENTS

CN 101079032 A 11/2007
CN 107169046 A 9/2017

OTHER PUBLICATIONS

Ramshaw_et_al "Experiments in Multi-Modal Automatic Content Extraction" BBN Technologies Cambridge, MA 02138 USA (Year: 2000).*

(Continued)

*Primary Examiner* — Vaishali Shah
*Assistant Examiner* — Berhanu Mitiku (57) ABSTRACT

The invention relates to an electronic element supporting data inquiry method, a storage medium and a terminal. The method comprises: obtaining an initial series element code; splitting the initial series element code according to a preset splitting mode to obtain at least a sub-word; establishing a corresponding relationship between the sub-word and the electronic element supporting data and storing the corresponding relationship in a database. Receiving an electronic element identifier; extracting at least a sub-word corresponding to the electronic element identifier, wherein the sub-word is a part of the electronic element identifier; searching for a data tag corresponding to the sub-word, wherein the data tag comprises the sub-word; obtaining the electronic element supporting data corresponding to the data tag. Through the implementation of the invention, the workload in the database construction process is greatly reduced, and the maintenance cost is reduced.

17 Claims, 4 Drawing Sheets

(58) Field of Classification Search
CPC ............... G06F 16/9554; G06F 16/58; G06F 16/90348; G06F 16/9535; G06F 16/353; G06F 16/9577
See application file for complete search history.

(56) References Cited

U.S. PATENT DOCUMENTS

| | | | | |
|---|---|---|---|---|
| 2004/0249627 A1* | 12/2004 | Mirkin | ............... | G06F 40/166 704/9 |
| 2005/0251536 A1* | 11/2005 | Harik | ............... | G06F 40/143 |
| 2012/0109932 A1* | 5/2012 | Li | ............... | G06F 16/313 707/E17.084 |

OTHER PUBLICATIONS

International Search Report of PCT Patent Application No. PCT/CN2018/124780 dated Sep. 26, 2019.
First Office Action of counterpart Chinese patent application No. 201811621545.9 dated Oct. 19, 2022.
Xiaoling Huang, The CAPSXpert Database: Introduction to a New Tool of Inquiring about Electronics Devices, May 31, 1998, pp. 52-53, vol. 5.

\* cited by examiner

```
┌─────────────────────────────────────────────────────────────┐
│ the first character of the electronic element code is used as a │─S1211
│ starting cursor, and the ending cursor traverses the electronic │
│ element code from the starting cursor to the suffix character;  │
└─────────────────────────────────────────────────────────────┘
                              ↓
┌─────────────────────────────────────────────────────────────┐
│ after the ending cursor traverses to the suffix character each time, │
│ the starting cursor is moved backward by one character, and the │
│ ending cursor traverses again until the starting cursor is located at │─S1212
│ the suffix character of the electronic element code, and the │
│                    traversal is ended;                       │
└─────────────────────────────────────────────────────────────┘
                              ↓
┌─────────────────────────────────────────────────────────────┐
│ during traversal, obtaining characters corresponding to the starting │
│ cursor and the ending cursor, and characters between the starting │─S1213
│ cursor and the ending cursor during traversal to form the detected │
│                          word.                               │
└─────────────────────────────────────────────────────────────┘
```

ELECTRONIC ELEMENT SUPPORTING DATA INQUIRY METHOD, STORAGE MEDIUM AND TERMINAL

BACKGROUND OF THE INVENTION

1. Technical Field

The invention relates to the field of electronic element data inquiry, in particular to an electronic element supporting data inquiry method, a storage medium and a terminal.

2. Description of Related Art

In an electronic element website, when a user needs to know a certain type of electronic element or needs to obtain the supporting information of a certain type of electronic element, the user needs to query a database through the electronic element type, so all the electronic elements need to establish corresponding databases.

Existing development tools, data and other original element resources only contain the naming rules of 'TC7SET☐☐FU', in which '☐' represents the wildcard character, which can be input as any character. When a user purchases a specific element, such as 'TC7SET28FU', the user only knows the specific element item number 'TC7SET28FU'. If the user needs to input 'TC7SET28FU', the original factory resources corresponding to the matched 'TC7SET☐☐FU' can be found. Then all the original factory resources need to be labeled with derivatives, that is, exhaustive '☐' fillable characters, that is, the item number of 'TC7SET28FU', only when all resources are pasted, can the corresponding resources be found by matching and searching, which greatly increases the cost and risk of maintenance.

BRIEF SUMMARY OF THE INVENTION

The technical problem to be solved by the invention is to provide an electronic element supporting data inquiry method, a storage medium and a terminal aiming at the defect that the workload of establishing a database before inquiring the electronic element data is large and the maintenance cost is high in the prior art.

The technical proposal adopted by the invention to solve the technical problem is to construct an electronic element supporting data inquiry method which comprises the following steps:
  receiving an electronic element identifier;
  extracting at least a sub-word corresponding to the electronic element identifier, wherein the sub-word is a part of the electronic element identifier;
  searching for a data tag corresponding to the sub-word, wherein the data tag comprises the sub-word;
  obtaining the electronic element supporting data corresponding to the data tag.

Further, before receiving an electronic element identifier, the electronic element supporting data inquiry method of the present invention further comprises a process of establishing a database:
  obtaining an initial series element code;
  splitting the initial series element code according to a preset splitting mode to obtain at least a sub-word;
  establishing a corresponding relationship between the sub-word and the electronic element supporting data and storing the corresponding relationship in a database.

Furthermore, in the electronic element supporting data inquiry method of the present invention, the initial series element code comprises at least one wildcard character;
  the method for splitting the initial series element code to obtain the sub-word comprises the following step: splitting the initial series element code into the sub-word according to the position of the wildcard character, wherein the sub-word is continuous character in the initial series element code;
  the establishing the corresponding relationship between the sub-word and the electronic element supporting data comprises: establishing the corresponding relationship between all the sub-word in the initial series element code and the same electronic element supporting data.

Furthermore, in the electronic element supporting data inquiry method of the present invention, the electronic element identifier includes one of the sub-word;
  the searching for a data tag corresponding to the sub-word comprises: searching for the data tag corresponding to the sub-word of the electronic element identifier, wherein the data tag comprises one of the sub-word.

Furthermore, in the electronic element supporting data inquiry method of the present invention, the electronic element identifier comprises at least two sub-words;
  the searching for a data tag corresponding to the sub-word comprises: searching for the data tag corresponding to all the sub-words in the electronic element identifier, wherein the data tag comprises the sub-words which are in one-to-one correspondence with the sub-words in the electronic element identifier.

Furthermore, in the electronic element supporting data inquiry method of the present invention, the extracting the sub-word corresponding to the electronic element identifier comprises:
  extracting a part of characters in the electronic element identifier as a detected word;
  judging whether the detected word exists in the database or not;
  and if so, confirming that the detected word is the sub-word of the electronic element identifier.

Furthermore, in the electronic element supporting data inquiry method of the present invention, the extracting part of the characters in the electronic element identifier as the detected word comprises:
  the first character of the electronic element identifier is used as a starting cursor, and the ending cursor starts to traverse the electronic element identifier from the starting cursor to a suffix character;
  after the ending cursor traverses to the suffix character each time, the starting cursor is shifted backward by one character, and the ending cursor traverses again until the starting cursor is positioned at the suffix character of the electronic element identifier, and the traversal is finished;
  obtaining characters corresponding to the starting cursor and the ending cursor and characters between the starting cursor and the ending cursor during traversal to form the detected word.

Further, the electronic element supporting data inquiry method of the present invention, after obtaining the electronic element supporting data corresponding to the data tag, the method further comprises:
  displaying the electronic element supporting data; or
  downloading the electronic element supporting data; or
  sending the electronic element supporting data.

In addition, the invention also provides a computer readable storage medium which stores a computer program, and when the computer program is executed by a processor, the electronic element supporting data inquiry method is realized.

In addition, the invention also provides a terminal which comprises a processor, wherein the processor is used for realizing the steps of the electronic element supporting data inquiry method when the computer program stored in the memory is executed.

The electronic element supporting data inquiry method, the storage medium and the terminal have the advantages that the method comprises the following steps of: obtaining an initial series element code; splitting the initial series element code according to a preset splitting mode to obtain at least a sub-word; establishing a corresponding relationship between the sub-word and the electronic element supporting data and storing the corresponding relationship in a database. Receiving an electronic element identifier; extracting at least a sub-word corresponding to the electronic element identifier, wherein the sub-word is a part of the electronic element identifier; searching for a data tag corresponding to the sub-word, wherein the data tag comprises the sub-word; obtaining the electronic element supporting data corresponding to the data tag. Through the implementation of the invention, only the product number naming rule provided in the original factory data needs to be input, and specific order numbers do not need to be exhaustively expanded, so that the workload in the database construction process is greatly reduced, and the maintenance cost is reduced.

BRIEF DESCRIPTION OF THE SEVERAL VIEWS OF THE DRAWINGS

Brief description of that drawing the invention will now be further described by way of example with reference to the accompany drawings in which.

Brief description of the drawings

DETAILED DESCRIPTION OF THE INVENTION

For a clearer understanding of the technical features, objects and effects of the present invention, a detailed description will now be given of specific embodiments of the present invention with reference to the accompanying drawings.

Example

Figure 1:
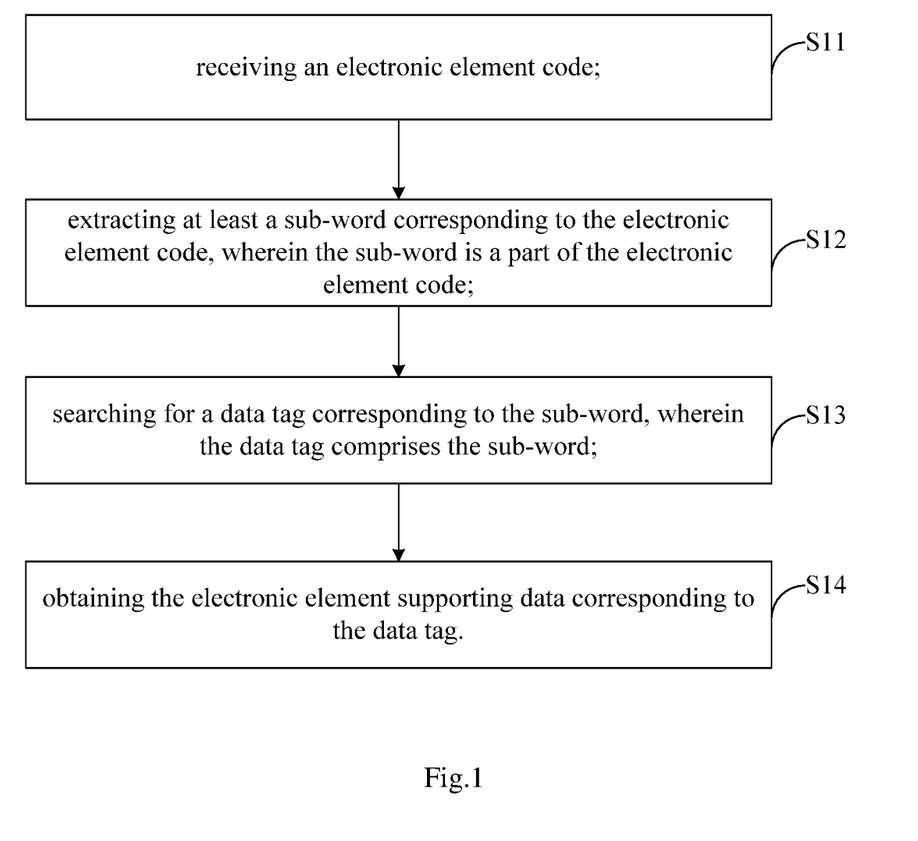
FIG. 1 is a flow chart of an electronic element supporting data inquiry method according to the present invention.

As shown in FIG. 1, the electronic element supporting data inquiry method in this embodiment comprises:

S11, receiving an electronic element identifier, wherein the electronic element identifier is a specific code of the electronic element, that is, the electronic element identifier is composed of all characters and does not contain a wildcard. Alternatively, the electronic element identifier may be received by an input device, or received and recognized by a voice receiving device, or received by a camera scanning a bar code or a two-dimensional code of the electronic element.

S12. Extracting at least a sub-word corresponding to the electronic element identifier, where the sub-word is a part of the electronic element identifier. The obtained sub-word may have one or more, and the order of the characters in the sub-word is consistent with the order of the characters in the electronic element identifier, that is, the sub-word is a segment in the electronic element identifier.

S13. Searching for a data tag corresponding to the sub-word, where the data tag includes the sub-word. The sub-word contained in the data tag are in one-to-one correspondence with the sub-word extracted from the electronic element identifier, and the so-called one-to-one correspondence requires that the number of the sub-word contained in the data tag is the same as that of the sub-word extracted from the electronic element identifier, and each sub-word is also in one-to-one correspondence with each other. Namely, if only one sub-word is extracted from the electronic element identifier, the data tag also comprises only one sub-word, and the sub-word in the electronic element identifier is consistent with the sub-word in the data tag; if only a plurality of sub-words are extracted from the electronic element identifier, the data tag only comprises a corresponding number of sub-words, and all the sub-words in the electronic element identifier are required to be consistent with all the sub-words in the data tag.

S14. Obtaining the electronic element supporting data corresponding to the data tag. There is one-to-one correspondence between the data tag and the electronic element supporting data. Because the data tag contains at least a sub-word, the sub-word is substantially one-to-one correspondence with the electronic element supporting data.

According to the embodiment of the invention, the electronic element supporting data can be quickly and accurately found by obtaining the sub-word corresponding to the electronic element identifier and further searching the electronic element supporting data through the sub-word.

Example

Figure 2:
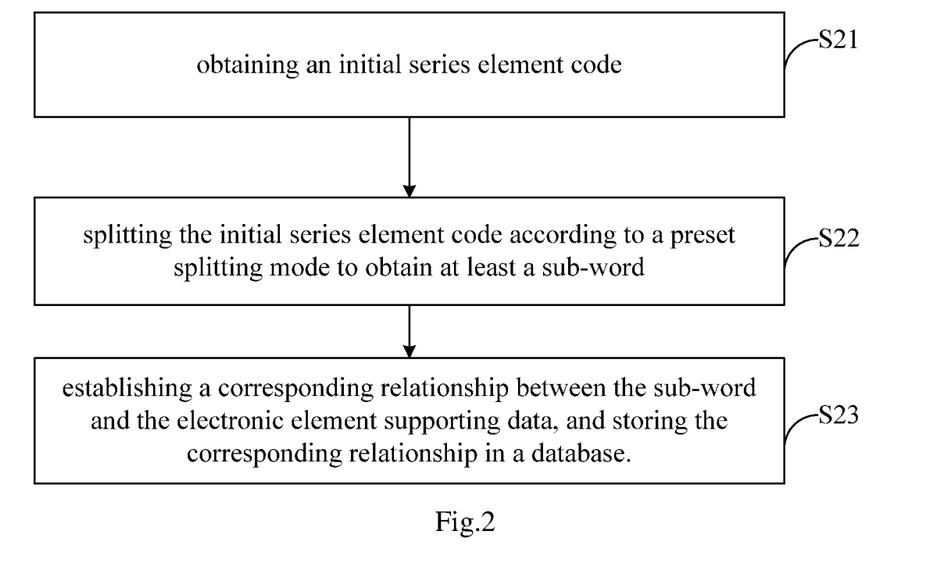
FIG. 2 is a flow chart of that process of establishing a database in the present invention.

As shown in FIG. 2, on the basis of the above embodiment, before receiving the electronic element identifier, the electronic element supporting data inquiry method of this embodiment further comprises a process of establishing a database:

S21, obtaining an initial series element code, wherein that initial series element code is a total code of a series of elements, a wildcard character is included in the total code, the wildcard character is a universal character, and the product code of the series of elements can be generated by changing the wildcard characters. For example, the initial series element code is 'TC7SET☐☐ FU', and '☐' is a wildcard, and different electronic element identifiers can be obtained by removing different values of '☐☐', for example, '☐☐' is 00, 01, 02, 03, 04, 05, 06, 07, 08, 09, 10, so as to obtain the number of some columns. Alternatively, the initial series element code may be received by an input device, or by a voice receiving device that receives and identifies the initial series of element codes, or by a camera that scans a bar code or two-dimensional code of an electronic element.

S22, splitting the initial series element code according to a preset splitting mode to obtain at least a sub-word. An initial series element code includes at least one bit of a wildcard; and splitting the initial series element code according to the preset splitting mode to obtain the sub-word, wherein the initial series element code is split into the sub-word according to the positions of the wildcards, and the sub-word are continuous characters in the initial series element code. For example, if one wildcard is included, or several consecutive wildcards are included, the initial series element code can be split by the wildcard, for example, the initial series element code is 'TC7SET□□FU', where '□□' is a wildcard, then 'TC7SET□□FU' can be split into two sub-words of 'TC7SET' and 'FU'.

S23, establishing a corresponding relationship between the sub-word and the electronic element supporting data, and storing the corresponding relationship in a database. And storing the sub-word of the obtained initial series element code into a database. The establishment of the corresponding relationship between the sub-word and the electronic element data includes the establishment of the corresponding relationship between all the sub-word in the initial series element code and the same electronic element data. For example, the initial series element code is two sub-words of 'TC7SET' and 'FU' of 'TC7SET □ □ FU', and the corresponding relationship between the two sub-words of '7SET' and 'FU' and the electronic element supporting data is established, that is, the corresponding relationship of the electronic element supporting data is corresponding to the two sub-words of 'TC7SET' and 'FU' at the same time.

In the embodiment, the sub-word is obtained by splitting the initial series element code, and the sub-word do not contain any wildcard, so that the uniqueness of the sub-word is realized, and further, the corresponding relationship with the electronic element supporting data can be established by using the uniqueness of the sub-word, and a database can be established.

Example

On the basis of the above embodiments, in the electronic element supporting data inquiry method of this embodiment, the electronic element identifier includes one of the sub-word; the searching for a data tag corresponding to at least a sub-word includes searching for a data tag corresponding to the sub-word in the electronic element identifier, the data tag including one of the sub-word.

According to the electronic element supporting data inquiry method of the embodiment, the electronic element identifier comprises at least two sub-words. The searching for the data tag corresponding to the sub-word comprises searching for the data tag corresponding to all the sub-words in the electronic element identifier, wherein the data tag comprises the sub-words which are in one-to-one correspondence with the sub-words in the electronic element identifier. For example, the initial series element code is two sub-words of 'TC7SET' and 'FU' of 'TC7SET□□FU', and the corresponding relationship between the two sub-words of 'TC7SET' and 'FU' and the electronic element supporting data is established, that is, the corresponding relationship of the electronic element supporting data is corresponding to the two sub-words of 'TC7SET' and 'FU' at the same time.

In the embodiment, in the process of searching the data tag corresponding to the sub-word, the data tag corresponding to all the sub-words in the electronic element identifier are needed, so that the uniqueness of the data is ensured.

Example

Figure 3:
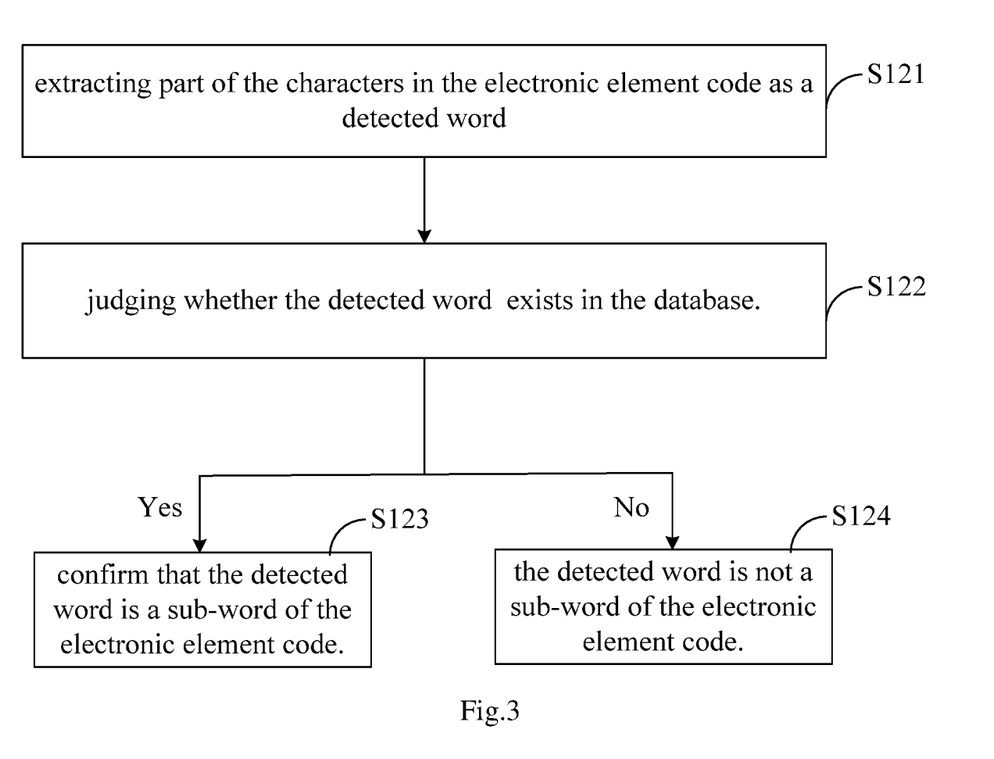
FIG. 3 is a flowchart of extracting sub-word corresponding to an electronic element identifier in the present invention.

As shown in FIG. 3, in the electronic element supporting data inquiry method in this embodiment, the extracting at least a sub-word corresponding to the electronic element identifier includes:

S121. extracting part of the characters in the electronic element identifier as a detected word where the detected word is a part of the electronic element identifier, and the sequence of the part of characters is consistent with the sequence of characters in the electronic element identifier.

S122. judging whether the detected word exists in the database. In the above embodiment, the sub-word obtained from the initial series element code is stored in the server, and it is judged whether the detected word exists in the database by judging whether the detected word is consistent with the sub-word stored in the database.

S123. if the detected word exists in the database, confirm that the detected word is a sub-word of the electronic element identifier.

S124. if the detected word element does not exist in the database, the detected word is not a sub-word of the electronic element identifier.

In this embodiment, that sub-word in the electronic element identifier is determined by determine whether the detected word in the electronic element identifier is in the data.

Figure 4:
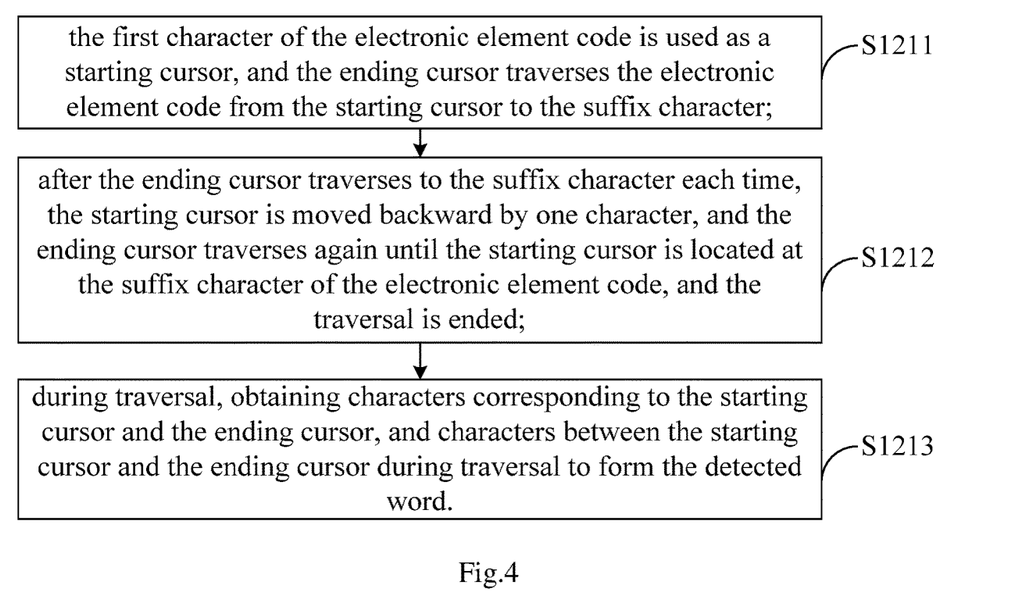
FIG. 4 is a flowchart of extracting detected word in that present invention.

As shown in FIG. 4, the electronic element supporting data inquiry method in this embodiment, which extracting part of the characters in the electronic element identifier as a detected word, includes:

S1211. the first character of the electronic element identifier is used as a starting cursor, and the ending cursor traverses the electronic element identifier from the starting cursor to the suffix character;

S1212. after the ending cursor traverses to the suffix character each time, the starting cursor is moved backward by one character, and the ending cursor traverses again until the starting cursor is located at the suffix character of the electronic element identifier, and the traversal is ended;

S1213. during traversal, obtaining characters corresponding to the starting cursor and the ending cursor, and characters between the starting cursor and the ending cursor during traversal to form the detected word.

Figure 5A:
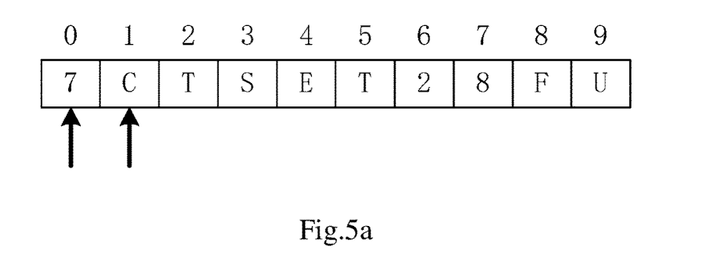
FIGS. 5a, 5b and 5c are structural diagrams of an electronic element identifier according to the present invention.
Figure 5B:
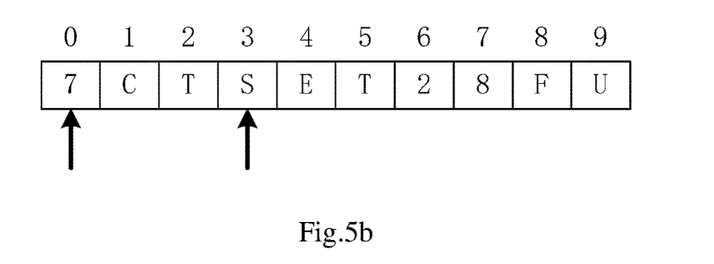
Figure 5C:
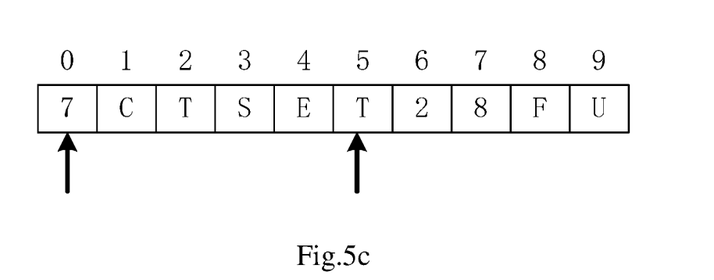

As shown in FIGS. 5a, 5b, and 5c, the initial series element is coded as '7CTSET28FU', which contains 10 characters: 7, C, T, S, E, T, 2, 8, F, and U. Each character is numbered from left to right as 0, 1, 2, 3, 4, 5, 6, 7, 8, and 9. Starting the traversal, the starting cursor is at character number 0, which is at character 7; the ending cursor traverses from character number 1, that is, from character C. At this time, a detected word '7C' is obtained. when the ending cursor moves to the character of number 3, a detected word '7CTS' is obtained; when the ending cursor moves to the character with the number 5, a detected word '7CTset' is obtained; and so on until that final character 'U' is detected.

After the first round of traversal is finished, the second round of traversal is carried out, the starting cursor is moved to the character with the number of 1, and the ending cursor starts to traverse from the character with the number of 2. When the ending cursor moves to the character of number 3, a detected word 'CTS' is obtained; when the ending cursor moves to the character of number 5, a detected word 'CTSET' is obtained; and so on until that final character 'U' is detected.

And the next round of traversal is carried out after the second round of traversal is finished, the starting cursor is moved backward by one character, the ending cursor is traversed again until the starting cursor is positioned at the tail character of the electronic element identifier, and then the traversing is finished. Characters corresponding to the starting cursor and the ending cursor and characters between the starting cursor and the ending cursor are obtained during traversal to form detected word.

The embodiment of the invention discloses an algorithm for acquiring a detected word, which can rapidly acquire the detected word in an electronic element identifier.

Alternatively, the electronic element supporting data inquiry method of some embodiments, after obtaining the electronic element supporting data corresponding to the data tag, further comprises: displaying the electronic elements supporting data.

Alternatively, the electronic element supporting data inquiry method of some embodiments, after obtaining the electronic element supporting data corresponding to the data tag, further comprises: downloading the electronic element supporting data.

Alternatively, the electronic element supporting data inquiry method according to some embodiments, after obtaining the electronic element supporting data corresponding to the data tag, further comprises: sending the electronic element supporting data. For example, the electronic element supporting data is sent to the mailbox reserved by the user, or the download link is sent to the mailbox reserved by the user or the account of the instant messaging tool. It is convenient for users to obtain information.

Example

The embodiment also provides a computer readable storage medium which stores a computer program, and the computer program can realize the electronic element supporting data inquiry method when being executed by a processor.

Example

Figure 6:
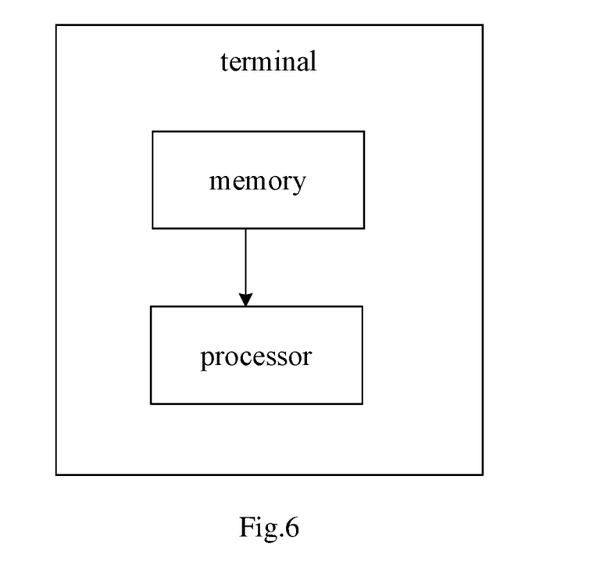
FIG. 6 is a schematic structural diagram of a terminal of the present invention.

As shown in FIG. 6, this embodiment also provides a terminal, the terminal comprises a processor, and the processor is used for executing the computer program stored in the memory to realize the steps of the electronic element supporting data inquiry method. Terminals include, but are not limited to, smart phones, tablets, laptops, desktop computers and other electronic devices.

Through the implementation of the invention, only the product number naming rule provided in the original factory data needs to be input, and specific order numbers do not need to be exhaustively expanded, so that the workload in the database construction process is greatly reduced, and the maintenance cost is reduced.

The embodiments are described in this specification in a progressive manner, with emphasis being placed on the differences between each embodiment and the other embodiments, and with reference to like parts of the embodiments. As for the device disclosed in the embodiment, since it corresponds to the method disclosed in the embodiment, the description is relatively simple, and the description of the related part can be referred to the method part.

Those skilled in the art will further appreciate that the example elements and algorithm steps described in connection with the embodiments disclosed herein can be implemented as electronic hardware, computer software, or a combination of both, and that the example elements and steps have been described generally functionally throughout the foregoing description in order to clearly illustrate the interchangeability of hardware and software. Whether these functions are performed in hardware or software depends on the particular application and design constraints of the technical solution. Killed artisans may implement the described functionality using different approaches for each particular application, but such implementations should not be construed as beyond the scope of the present invention.

The steps of a method or algorithm described in connection with the embodiments disclosed herein may be embodied directly in hardware, in a software module executed by a processor, or in a combination of the two. A software module may reside in random access memory (RAM), memory, read only memory (ROM), electrically programmable ROM, electrically erasable programmable ROM, registers, hard disk, a removable disk, a CD-ROM, or any other form of storage medium known in the art.

The above embodiments are only for illustrating the technical concepts and features of the present invention, and are intended to enable those skilled in the art to understand and implement the present invention, but not to limit the scope of protection of the present invention. All equivalent change and modifications that come within that scope of the append claims are intended to be embraced therein.

What is claimed is:

1. An electronic element supporting data inquiry method comprising:
   receiving an electronic element identifier;
   extracting at least a sub-word corresponding to the electronic element identifier, wherein the sub-word is a part of the electronic element identifier;
   searching for a data tag corresponding to the sub-word, wherein the data tag comprises the sub-word;
   and obtaining the electronic element supporting data corresponding to the data tag;
   before receiving the electronic element identifier, the method further comprises establishing a database process:
   obtaining an initial series element identifier;
   splitting the initial series element identifier according to a preset splitting mode to obtain at least a sub-word;
   and establishing a corresponding relationship between the sub-word and the electronic element supporting data and storing the corresponding relationship in a database;
   the extracting the sub-word corresponding to the electronic element identifier comprises:
   extracting a part of characters in the electronic element identifier as a detected word;
   judging whether the detected word exists in the database or not;
   and if the detected word exists in the database, confirm that the detected word is the sub-word of the electronic element identifier;
   wherein the extracting a part of the characters in the electronic element identifier as the detected word comprises:
   the first character of the electronic element identifier is used as a starting cursor, and the ending cursor starts to traverse the electronic element identifier from the starting cursor to a suffix character;

after the ending cursor traverses to the suffix character each time, the starting cursor is shifted backward by one character, and the ending cursor traverses again until the starting cursor is positioned at the suffix character of the electronic element identifier, and the traversal is finished;

obtaining characters corresponding to the starting cursor and the ending cursor and characters between the start cursor and the ending cursor during traversal to form the detected word.

2. The electronic element supporting data inquiry method according to claim 1, wherein the initial series element identifier comprises at least one wildcard character;

the method for splitting the initial series element identifier to obtain at least a sub-word comprises the following step: splitting the initial series element identifier into the sub-word;

according to the positions of the wildcard character, wherein the sub-word is continuous characters in the initial series element identifier;

the establishing a corresponding relationship between the sub-word and the electronic element supporting data comprises: establishing the corresponding relationship between all the sub-word in the initial series element identifier and the same electronic element supporting data.

3. The electronic element supporting data inquiry method of claim 2, wherein the electronic element identifier comprises one of the sub-word;

the searching for the data tag corresponding to the sub-word comprises: searching for the data tag corresponding to the sub-word of the electronic element identifier, wherein the data tag comprises one of the sub-word.

4. The electronic element supporting data inquiry method of claim 2, wherein the electronic element identifier comprises at least two sub-words;

the searching for the data tag corresponding to the sub-word comprises:

searching for the data tag corresponding to all the sub-words in the electronic element identifier, wherein the data tag comprises the sub-words which are in one-to-one correspondence with the sub-word in the electronic element identifier.

5. The electronic element supporting data inquiry method according to claim 1, wherein after obtaining the electronic element supporting data corresponding to the data tag, the method further comprises:

displaying the electronic element supporting data; or
downloading the electronic element supporting data; or
sending the electronic element supporting material.

6. The electronic element supporting data inquiry method according to claim 2, wherein the extracting the sub-word corresponding to the electronic element identifier comprises:

extracting a part of characters in the electronic element identifier as a detected word;

judging whether the detected word exists in the database or not;

and if so, confirm that the detected word is the sub-word of the electronic element identifier.

7. The electronic element supporting data inquiry method according to claim 3, wherein the extracting the sub-word corresponding to the electronic element identifier comprises:

extracting a part of characters in the electronic element identifier as a detected word;

judging whether the detected word exists in the database or not;

and if so, confirm that the detected word is the sub-word of the electronic element identifier.

8. The electronic element supporting data inquiry method according to claim 4, wherein the extracting the sub-word corresponding to the electronic element identifier comprises:

extracting a part of characters in the electronic element identifier as a detected word;

judging whether the detected word exists in the database or not;

and if so, confirm that the detected word is the sub-word of the electronic element identifier.

9. The electronic element supporting data inquiry method according to claim 6, wherein the extracting a part of the characters in the electronic element identifier as the detected word comprises:

the first character of the electronic element identifier is used as a starting cursor, and the ending cursor starts to traverse the electronic element identifier from the starting cursor to a suffix character;

after the ending cursor traverses to the suffix character each time, the starting cursor is shifted backward by one character, and the ending cursor traverses again until the starting cursor is positioned at the suffix character of the electronic element identifier, and the traversal is finished;

obtaining characters corresponding to the starting cursor and the ending cursor and characters between the start cursor and the ending cursor during traversal to form the detected word.

10. The electronic element supporting data inquiry method according to claim 7, wherein the extracting a part of the characters in the electronic element identifier as the detected word comprises:

the first character of the electronic element identifier is used as a starting cursor, and the ending cursor starts to traverse the electronic element identifier from the starting cursor to a suffix character;

after the ending cursor traverses to the suffix character each time, the starting cursor is shifted backward by one character, and the ending cursor traverses again until the starting cursor is positioned at the suffix character of the electronic element identifier, and the traversal is finished;

obtaining characters corresponding to the starting cursor and the ending cursor and characters between the start cursor and the ending cursor during traversal to form the detected word.

11. The electronic element supporting data inquiry method according to claim 8, wherein the extracting a part of the characters in the electronic element identifier as the detected word comprises:

the first character of the electronic element identifier is used as a starting cursor, and the ending cursor starts to traverse the electronic element identifier from the starting cursor to a suffix character;

after the ending cursor traverses to the suffix character each time, the starting cursor is shifted backward by one character, and the ending cursor traverses again until the starting cursor is positioned at the suffix character of the electronic element identifier, and the traversal is finished;

obtaining characters corresponding to the starting cursor and the ending cursor and characters between the start cursor and the ending cursor during traversal to form the detected word.

12. A non-transitory computer-readable storage medium having a computer program stored thereon, wherein the computer program, when executed by a processor, realizes the electronic element supporting data inquiry method according to claim 1.

13. The non-transitory computer-readable storage medium according to claim 12, wherein before receiving the electronic element identifier, the method further comprises establishing a database process:
    obtaining an initial series element identifier;
    splitting the initial series element identifier according to a preset splitting mode to obtain at least a sub-word;
    and establishing a corresponding relationship between the sub-word and the electronic element supporting data and storing the corresponding relationship in a database.

14. The non-transitory computer-readable storage medium according to claim 13, wherein the initial series element identifier comprises at least one wildcard character;
    the method for splitting the initial series element identifier to obtain at least a sub-word comprises the following step: splitting the initial series element identifier into the sub-word according to the positions of the wildcard character, wherein the sub-word is continuous characters in the initial series element identifier;
    the establishing a corresponding relationship between the sub-word and the electronic element supporting data comprises: establishing the corresponding relationship between all the sub-word in the initial series element identifier and the same electronic element supporting data.

15. A terminal comprising a processor for implementing the steps of the electronic element supporting data inquiry method according to claim 1 when executing a computer program stored in a memory.

16. The terminal according to claim 15, wherein before receiving the electronic element identifier, the method further comprises establishing a database process:
    obtaining an initial series element identifier;
    splitting the initial series element identifier according to a preset splitting mode to obtain at least a sub-word;
    and establishing a corresponding relationship between the sub-word and the electronic element supporting data and storing the corresponding relationship in a database.

17. The terminal according to claim 16, wherein the initial series element identifier comprises at least one wildcard character;
    the method for splitting the initial series element identifier to obtain at least a sub-word comprises the following step: splitting the initial series element identifier into the sub-word according to the positions of the wildcard character, wherein the sub-word is continuous characters in the initial series element identifier;
    the establishing a corresponding relationship between the sub-word and the electronic element supporting data comprises: establishing the corresponding relationship between all the sub-word in the initial series element identifier and the same electronic element supporting data.

* * * * *